United States Patent [19]
Hönemann

[11] 3,842,954
[45] Oct. 22, 1974

[54] CLUTCH WITH CENTRAL PIN RELEASE BEARING

[75] Inventor: Rudolf Hönemann, Flechtorf Sudetenring, Germany

[73] Assignee: Volkswagenwerk Aktiengesellschaft, Wolfsburg, Germany

[22] Filed: Mar. 8, 1973

[21] Appl. No.: 339,363

[30] Foreign Application Priority Data
Mar. 10, 1972 Germany............................ 2211521

[52] U.S. Cl............. 192/96, 192/110 B, 192/109 A
[51] Int. Cl............................................. F16d 23/12
[58] Field of Search......... 192/96, 97, 110 B, 109 A

[56] References Cited
UNITED STATES PATENTS

| | | |
|---|---|---|
| 1,913,944 | 6/1933 | Morin............................... 192/97 X |
| 2,844,973 | 7/1958 | Hill................................... 192/96 X |
| 3,283,866 | 11/1966 | DiGiacosa.............................. 192/96 |
| 3,420,346 | 1/1969 | Millward......................... 192/111 A |
| 3,497,155 | 2/1970 | Mimeur............................. 192/96 X |

Primary Examiner—Benjamin W. Wyche
Attorney, Agent, or Firm—Brumbaugh, Graves, Donohue & Raymond

[57] ABSTRACT

Apparatus for operation of a clutch, arranged in an automobile between the engine and the transmission, has a throw-out lever associated with the clutch pedal. This throw-out lever operates on a release bearing and the release bearing in turn causes the axial movement of a pressure rod which disengages the clutch. The release bearing contains at least one element rotating with a component of the clutch, a supporting or bearing surface element for the throw-out lever and an axial thrust bearing between the two.

8 Claims, 4 Drawing Figures

CLUTCH WITH CENTRAL PIN RELEASE BEARING

BACKGROUND OF THE INVENTION

This invention relates to clutches and more particularly to mechanically operated automobile clutches.

In a typical device for mechanical clutch operation, such as that disclosed in German Pat. No. 925,333, the rotating element of the release bearing is rigidly connected to the shaft driven by the clutch. Also, the thrust bearing is placed directly between the rotating element of the release bearing and the supporting element for the throw-out lever. Therefore, whenever the clutch is engaged, the rotating element of the release bearing is accelerated up to the motor speed along with the shaft of the driven clutch plate.

A method of avoiding the acceleration loads placed on this rotating element is disclosed in U.S. Pat. No. 3,283,866 of Giacosa. This patent application shows a construction in which actuation of the clutch is obtained hydraulically and not mechanically. However, the application does show a pressure rod with one end in rigid contact with the pressure plate of the driven element of the clutch and the other end in friction contact with the rotating element of the release bearing. This causes the rotating element to turn at the motor speed whether the clutch is engaged or not. The operation of this clutch is caused by the axial movement of the pressure rod due to a hydraulically operated piston. The release bearing is located between the piston and the pressure rod. Besides the rotating element this release bearing also contains a thrust bearing which insulates the motion of the rotating element from the piston. To supply initial tension for the apparatus, a pressure spring is positioned behind the piston. With this arrangement, the rotating element is maintained at the engine speed and there is no need to accelerate it. However, it would be desirable to have apparatus which functions along these lines, but which is mechanically operated.

SUMMARY OF THE INVENTION

It is the purpose of this invention to create a device, specifically for mechanical clutch operation, which avoids the need for acceleration of the rotating element of the release bearing to the speed of the engine and which compensates for the wear of the clutch.

In an illustrative embodiment of this invention, a throw-out lever, in operative connection with the clutch pedal, is provided to create an axial displacement of a pressure rod. A release bearing is in turn located between the throw-out lever and the pressure rod. Activation of the clutch pedal causes the throw-out lever to put pressure on the release bearing and, in turn, on the pressure rod, thereby causing the clutch to disengage. The end of the release bearing in contact with the pressure rod has a rotating element, which is in friction contact with the pressure rod. On the other end of the release bearing is a support or bearing surface for the throw-out lever which acts as a housing for the release bearing. Next to the support in the release bearing is a pressure spring, which presses against a thrust bearing located between the spring and the rotating element. The thrust bearing allows the pressure from the non-rotating throw-out lever to be applied to the rotating element of the release bearing. With this combination the rotating element turns at the speed of the engine at all times and the need for accelerating it during disengagement of the clutch is eliminated.

The pressure spring is dimensioned so that for all operating conditions of the clutch, there exists a frictional connection between the throw-out lever and the driving component of the clutch along a common axis which passes through the release bearing and the pressure rod. This spring also allows for compensation of the wear of the clutch lining by automatic re-alignment of the parts of the apparatus.

In addition, a thrust plate may also be arranged in the release bearing between the pressure spring and the thrust bearing. In an alternative arrangement, this thrust plate may be formed as the housing for the release bearing rather than using the support element as the housing.

BRIEF DESCRIPTION OF THE DRAWINGS

The foregoing and other features of the present invention will be more readily apparent from the following detailed description and drawings in which.

DESCRIPTION OF EXEMPLARY EMBODIMENTS

Figure 1:
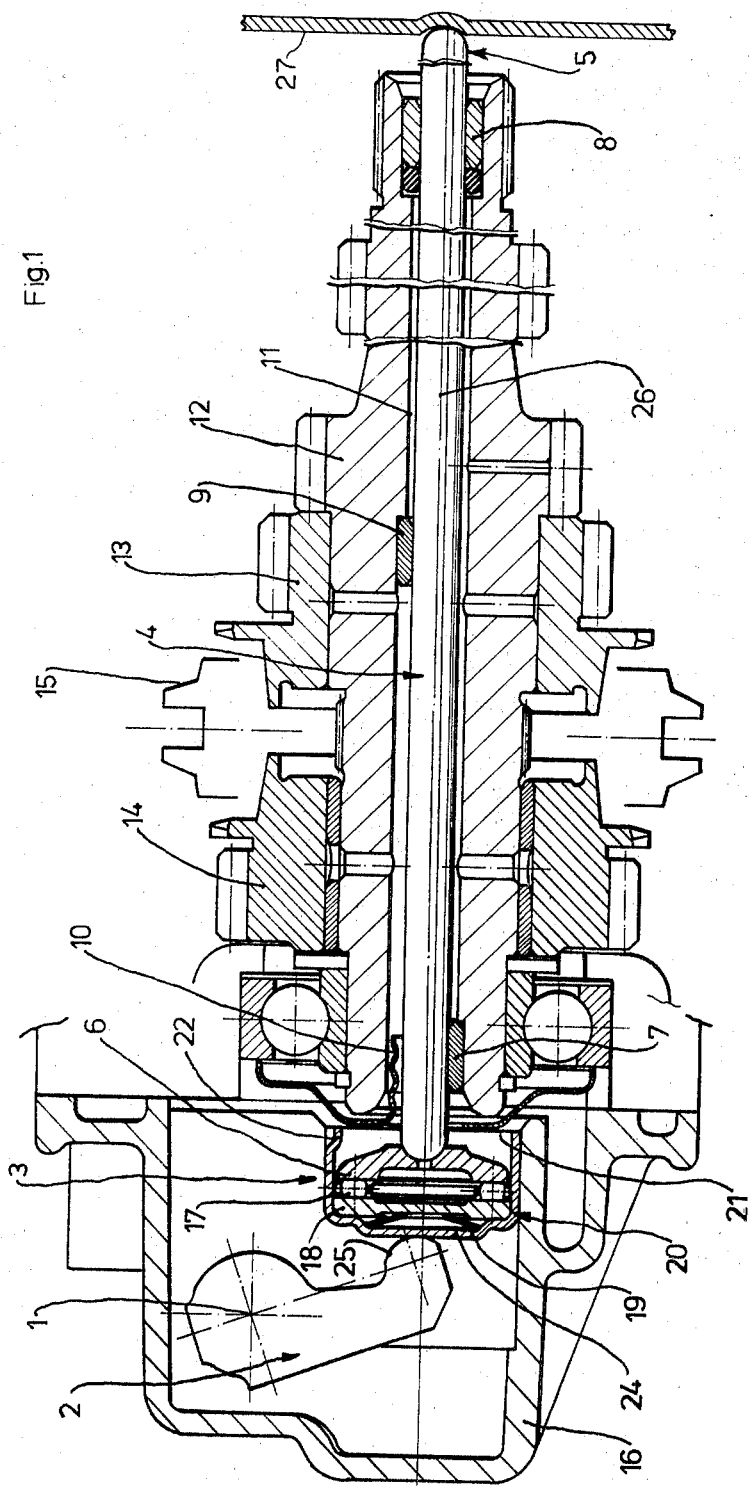
FIG. 1 is an illustrative embodiment of the invention with the clutch disengaged.

In FIG. 1 there is shown an illustrative embodiment of the present invention with the clutch disengaged. A throw-out lever 2 which may move about shaft 1 when actuated by a clutch pedal (not shown) bears against housing 20 of release bearing 3. The release bearing 3 transmits the motion of the throw-out lever 2 to a pressure rod 4 whose end 5 is in friction contact with the driving pressure plate 27 of a friction clutch.

This clutch may be of a conventional type, such as that described in U.S. Pat. No. 3,283,866 of Giacosa, which operates due to the axial motion of a shaft. The clutch shown in this patent has a driving clutch plate bolted to the motor shaft. Covering the driving clutch plate is a housing with an aperture in its center to allow for passage of the pressure rod and the shaft of the driven clutch plate. The driven clutch plate itself is located between the driving clutch plate and its housing. A first set of springs tends to prevent contact between these two clutch plates. However, under normal conditions these plates are forced together by the action of a second set of springs. When the pressure rod is moved so as to disengage the clutch, the rod presses against a pressure plate which in turn presses against the second set of springs and allows the first set of springs to effect disengagement of the clutch plates.

In FIG. 1 the support element 20 not only acts as a bearing surface for the throw-out lever 2, but also acts as a housing for the other elements of the release bearing. These other elements of the release bearing include an axial thrust bearing 17 and a pressure spring 19 located between the support element 20 and the thrust bearing 17. The pressure spring may be in any convenient shape, for example, a helical spring or a cup spring. A rotating element 6 is placed between the thrust bearing and the end of the pressure rod 4, and is maintained in friction contact with the pressure rod. Because of the pressure exerted by a spring 19, the rotating element is driven by the pressure rod and always rotates at the same speed as the driving plate of the clutch.

The pressure rod 4 is supported in the clearance 11 through the transmission using either friction bearings 7 and 8 or friction bearing 9 and an oil conveying thread 10. The construction of the various gears of the transmission 12, 13 and 14 as well as the synchronizing device 15 are of conventional design and are not important to an understanding of this invention.

The release bearing 3 together with the throw-out lever 2 is supported in the oil filled housing 16 which may constitute a part of the gear case. Also, a thrust or check plate 18 may be included in the release bearing between the pressure spring 19 and the thrust bearing 17.

Figure 2:
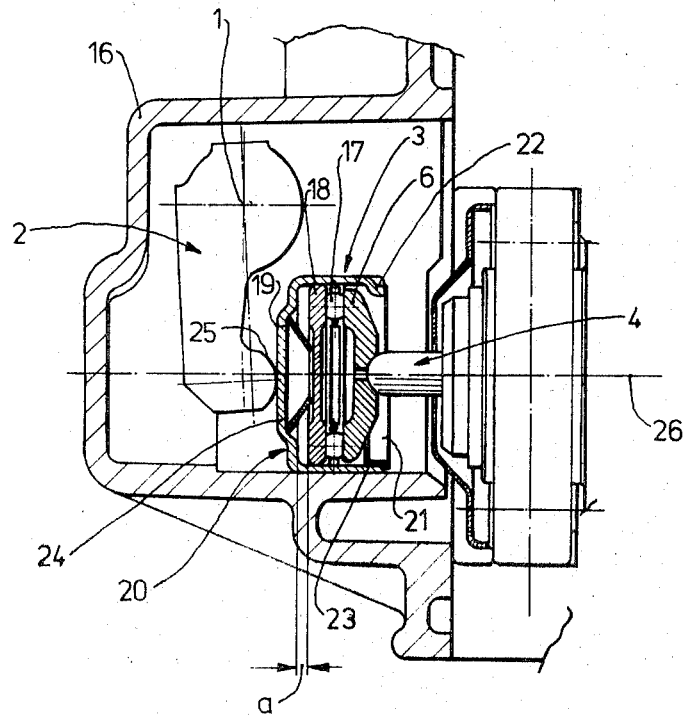
FIG. 2 is the same as FIG. 1 except that the clutch is engaged.

The housing formed by support element 20 has an entry opening 21 for the pressure rod 4 so that the rod can make contact with the rotating element 6 in the area of a recess provided in the rotating element. In order for the release bearing to form a single unit prior to incorporation into the rest of the apparatus, the housing is provided with corrugations 22 in the area of the entry opening 21. These corrugations cause a reduction in the diameter of the housing to a size which is smaller than the outer diameter of the rotating element 6, thereby keeping the release bearing in one piece. As indicated in FIG. 2, this can also be achieved through the use of a retaining plate 23 in place of or in addition to the corrugations 22.

The wall 24 of support 20 cooperates with the rounded surface 25 of the throw-out lever 2 in order to provide support for the throw-out lever. A comparison of FIGS. 1 and 2 shows that the lever 2 is aligned in such a manner that the contact between its surface 25 and the wall 24 always occurs along the intersection of the common axis 26 with the wall.

As was previously mentioned, FIG. 1 shows the apparatus with the clutch disengaged, i.e., with the actuation of lever 2. In this condition, the thrust plate 18 comes to rest against a ring-shaped support surface of wall 24 of support 20, so that the pressure spring 19 is compressed. When the clutch is engaged, however, as indicated in FIG. 2, there exists a gap $a$ between wall 24 and the thrust plate 18. This gap serves to compensate for the wear of the clutch linings during the life of the clutch. As the linings wear down on a clutch such as that shown in the above-identified U.S. patent the rod 4 is displaced to the left in FIGS. 1 and 2. The gap $a$ allows for this movement without affecting the operation of the invention. However, when the gap is eliminated, new clutch linings must be installed, thereby moving the rod to the right and re-establishing the gap.

Figure 4:
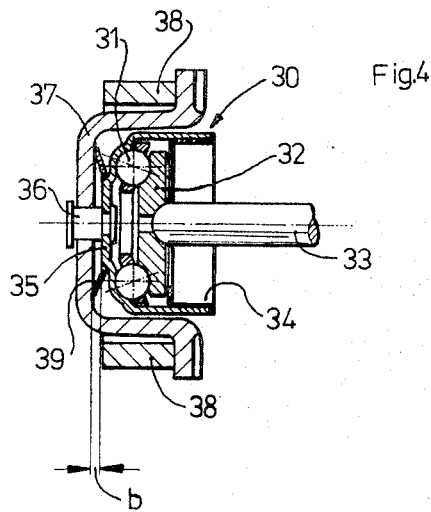
FIG. 4 is the same as FIG. 3, except that the clutch is engaged.
Figure 3:
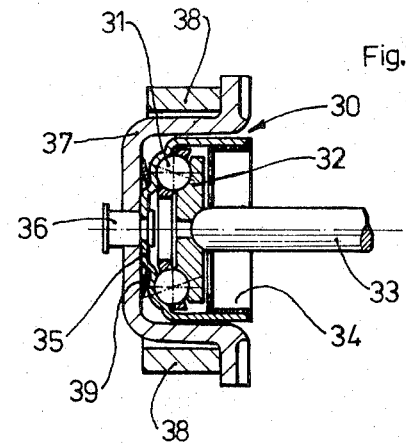
FIG. 3 is an embodiment of the invention with the thrust plate used as the release bearing housing and the clutch disengaged.

FIGS. 3 and 4 represent another embodiment of the release bearing in accordance with the invention. In FIG. 3 the housing is no longer formed by the support element 20 for the throw-out lever 2, but, rather, is formed by the thrust plate 30. Therefore, this housing accommodates only the thrust bearing 31, constructed as a ball bearing with its axis of contact inclined along the pressure rod axis, and the rotating element 32, which is frictionally connected with the pressure rod 33. By means of the insert 34, the elements of the release bearing are retained in the housing prior to its incorporation in the rest of the apparatus.

The wall 35 of housing 30 is provided with an opening into which is set a rivet-like element 36. Mounted in sliding contact with the rivet element is a bridge-shaped bearing element 37 which the fork-shaped portion 38 of the throw-out lever bears against. A pressure spring 39, which fulfills the same purpose as the pressure spring 19 in FIGS. 1 and 2, is provided between the bearing element 37 and the wall 35.

In FIG. 4 the apparatus of FIG. 3 is shown with the clutch engaged and the same numerical designations used in FIG. 3 are used to indicate the same parts. In FIG. 4 the gap $b$, which is similar to gap $a$ in FIG. 2, is indicated. This gap performs the same function of compensating for the wear of the clutch linings as does gap $a$. Also, the embodiment of the invention shown in FIGS. 3 and 4 can be enclosed in an oil filled housing, such as housing 16 shown in FIGS. 1 and 2.

While the invention has been particularly shown and described with reference to preferred embodiments thereof, it will be understood by those skilled in the art that various changes in form and details may be made therein without departing from the spirit and scope of the invention. For example, the invention can be used in vehicles other than automobiles and may also be used for clutches on stationary devices.

I claim:

1. Apparatus for mechanical operation of a clutch that is arranged between an engine and a transmission, said apparatus comprising:
   a pressure rod having its first end in friction contact with that pressure plate of the clutch which is rotating at engine speed;
   a clutch throw-out lever means for enabling mechanical operation of the clutch; and
   a clutch release bearing located between said lever means and said pressure rod, said release bearing comprising a support element against which said lever means bears, a thrust bearing, a pressure spring located between the support element and the thrust bearing and a rotating element with one side in contact with the second end of said pressure rod and the other side in contact with the thrust bearing, said pressure spring being of such dimensions that for all operating conditions of the clutch it ensures a connection between said lever means and the pressure plate in the direction of a common axis of said release bearing, said pressure rod and said pressure plate, said support element being in the shape of a housing for the other elements of said release bearing and having an entrance opening for said pressure rod of such a dimension as to retain the elements of said release bearing in one unit prior to incorporation of the release bearing in said apparatus.

2. Apparatus as claimed in claim 1 wherein the pressure spring is a cup spring.

3. Apparatus as claimed in claim 1 wherein the thrust bearing is an axially inclined ball bearing.

4. Apparatus as claimed in claim 1 wherein the throw-out lever and the release bearing are arranged in a common oil filled housing.

5. Apparatus as claimed in claim 1 wherein said throw-out lever bears against a wall of said housing at the point where the common axis intersects the wall.

6. Apparatus as claimed in claim 1 further including a thrust plate located between the pressure spring and the thrust bearing of said release bearing.

7. Apparatus for mechanical operation of a clutch that is arranged between an engine and a transmission, said apparatus comprising:
- a pressure rod having its first end in friction contact with that pressure plate of the clutch which is rotating at engine speed;
- a clutch throw-out lever means for enabling mechanical operation of the clutch; and
- a clutch release bearing located between said lever means and said pressure rod, said release bearing comprising a support element against which said lever means bears, a thrust plate, a pressure spring located between the support element and the thrust plate, a rotating element with one side in contact with the second end of said pressure rod and a thrust bearing located between the other side of said rotating element and said thrust plate, said pressure spring being of such dimensions that for all operating conditions of the clutch it ensures a connection between said lever means and the pressure plate in the direction of a common axis of said release bearing, said pressure rod and said pressure plate, said thrust plate being in the shape of a thrust plate housing for the thrust bearing and the rotating element and having an entrance opening for said pressure rod and a set-in flange in the area of the entrance, said set-in flange acting as an abutment for the rotating element, thereby retaining the elements of the release bearing as a single unit prior to incorporation of the release bearing in said apparatus.

8. Apparatus as claimed in claim 7 further including a rivet means for connecting said thrust plate housing to said pressure spring along the common axis, the support being in the shape of a bridge surrounding three sides of said thrust plate housing and having a set of flanges at its periphery, said throw-out lever contacting the flanges of said support along a fork-shaped area of said throw-out lever.

* * * * *